US009678932B2

(12) United States Patent
Jwa et al.

(10) Patent No.: US 9,678,932 B2
(45) Date of Patent: Jun. 13, 2017

(54) METHOD AND APPARATUS FOR EXTRACTING BODY ON WEB PAGE (71) Applicant: Samsung Electronics Co. Ltd., Suwon-si, Gyeonggi-do (KR)

(72) Inventors: Chang-Hyup Jwa, Jeju (KR); Mariusz Grzegorczyk, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 13/791,183

(22) Filed: Mar. 8, 2013

(65) Prior Publication Data
US 2013/0238978 A1 Sep. 12, 2013

(30) Foreign Application Priority Data

Mar. 8, 2012 (KR) ........................ 10-2012-0023988

(51) Int. Cl.
G06F 17/22 (2006.01)
G06F 17/24 (2006.01)
G06F 17/30 (2006.01)

(52) U.S. Cl.
CPC ........ G06F 17/24 (2013.01); G06F 17/30905 (2013.01); Y02B 60/188 (2013.01)

(58) Field of Classification Search
CPC ........... G06F 17/30905; G06F 17/2247; G06F 17/30899; G06F 17/3089; G06F 17/30867; G06F 17/211; G06F 3/1205; G06F 3/04842; G06F 17/2705; Y02B 60/188
See application file for complete search history.

(56) References Cited

U.S. PATENT DOCUMENTS

| 6,701,350 | B1 * | 3/2004 | Mitchell ........... G06F 17/30884 705/14.73 |
| 7,073,122 | B1 | 7/2006 | Sedghi |
| 7,900,149 | B2 * | 3/2011 | Hatcher ............. H04L 12/5835 715/234 |
| 7,934,152 | B2 * | 4/2011 | Krishnamurthy et al. ... 715/234 |
| 2003/0229854 | A1 | 12/2003 | Lemay |
| 2003/0237053 | A1 * | 12/2003 | Chen ................. G06F 17/30905 715/234 |
| 2004/0158799 | A1 | 8/2004 | Breuel |
| 2005/0251742 | A1 * | 11/2005 | Mogilevsky et al. ........ 715/521 |
| 2005/0273706 | A1 | 12/2005 | Manber et al. |
| 2006/0280373 | A1 * | 12/2006 | Uchida ......................... 382/243 |
| 2008/0307328 | A1 | 12/2008 | Hatcher et al. |
| 2009/0177959 | A1 * | 7/2009 | Chakrabarti et al. ......... 715/234 |
| 2010/0281400 | A1 * | 11/2010 | Forutanpour et al. ........ 715/760 |
| 2011/0302510 | A1 * | 12/2011 | Harrison et al. .............. 715/760 |
| 2012/0015694 | A1 | 1/2012 | Han |
| 2012/0096341 | A1 * | 4/2012 | Suga .............................. 715/234 |
| 2012/0216107 | A1 * | 8/2012 | Iwabuchi ...................... 715/231 |
| 2013/0212498 | A1 * | 8/2013 | Lim et al. ...................... 715/760 |

FOREIGN PATENT DOCUMENTS

| CN | 102333146 A | 1/2012 |
| WO | 2012/012917 A1 | 2/2012 |

* cited by examiner

Primary Examiner — Wilson Tsui
(74) Attorney, Agent, or Firm — Jefferson IP Law, LLP (57) ABSTRACT An apparatus and a method for extracting a body from a web page are provided. The method includes, determining a start node for the extracting of the body from the web page according to a coordinate designated by a user, determining a body region according to the start node, and displaying the determined body region.

20 Claims, 11 Drawing Sheets

METHOD AND APPARATUS FOR
EXTRACTING BODY ON WEB PAGE

PRIORITY

This application claims the benefit under 35 U.S.C. §119(a) of a Korean patent application filed in the Korean Intellectual Property Office on Mar. 8, 2012 and assigned Serial No. 10-2012-0023988, the entire disclosure of which is hereby incorporated by reference.

BACKGROUND OF THE INVENTION

1. Field of the Invention

The present invention relates to extracting a body of a web page. More particularly, the present invention relates to a method and an apparatus for extracting a body in a web page and displaying the same.

2. Description of the Related Art

The use of portable electronic devices for data communications has rapidly increased. A user may access a website, which may also be referred to as a "site" herein, hosted on the Internet, using a variety of portable electronic devices. When a user accesses a site having a body region, such as a web newspaper or a blog, via a portable electronic apparatus, application programs using a related-art technology may analyze an entire HyperText Markup Language (HTML) page and may configure a body simultaneously with ending of reception of a HTML file of a relevant site.

In the case where a portable electronic apparatus extracts a body of a web page, since an entire HTML page of a relevant page may be analyzed, power consumption and an amount of use of a Central Processing Unit (CPU) may be high. For example, in the case where a user browses a photo board where body extraction is not needed when performing web browsing, an entire file may be analyzed whenever an HTML page is received, such that power consumption and a use amount of a CPU increase. In addition, according to the related-art technology, only one article body may be fixedly extracted in one page, and thus, extraction may be not performed on other regions, such as long comments included in the one article and that are not included in the body.

Therefore, a need exists for a system and method for extracting a body in a web page and displaying the same.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for extracting a body on a web page.

Another aspect of the present invention is to provide a method and an apparatus for raising readability of a body by extracting contents, such as text and images, of the body from a web page including an advertisement, a related link, or other similar elements, in order to display the body to a user, and for improving user experience.

Still another aspect of the present invention is to provide a method and an apparatus for extracting only content of a body without scrolling up and/or down and left and/or right in the case where a width of the body of a web page optimized for a desktop computer may be wider than a screen width of a mobile apparatus such that left and/or right scrolling is required in addition to up and/or down scrolling in order to view entire content, such that a user may not view content without left and/or right scrolling and up and/or down scrolling.

In accordance with an aspect of the present invention, a method for extracting a body from a web page is provided. The method includes determining a start node for the extracting of the body from the web page according to a coordinate designated by a user, determining a body region according to the start node, and displaying the determined body region.

In accordance with another aspect of the present invention, an electronic apparatus for extracting a body from a web page is provided. The apparatus includes a touchscreen display for detecting a user touch input, at least one processor for processing operations of at least one program that is executed on the electronic apparatus, and a memory for storing the at least one program, wherein the at least one program is for determining a start node for the extracting of the body from the web page according to a coordinate designated by a user, for determining a body region according to the start node, and for displaying the determined body region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method and an apparatus for extracting a body of a web page.

Figure 1:
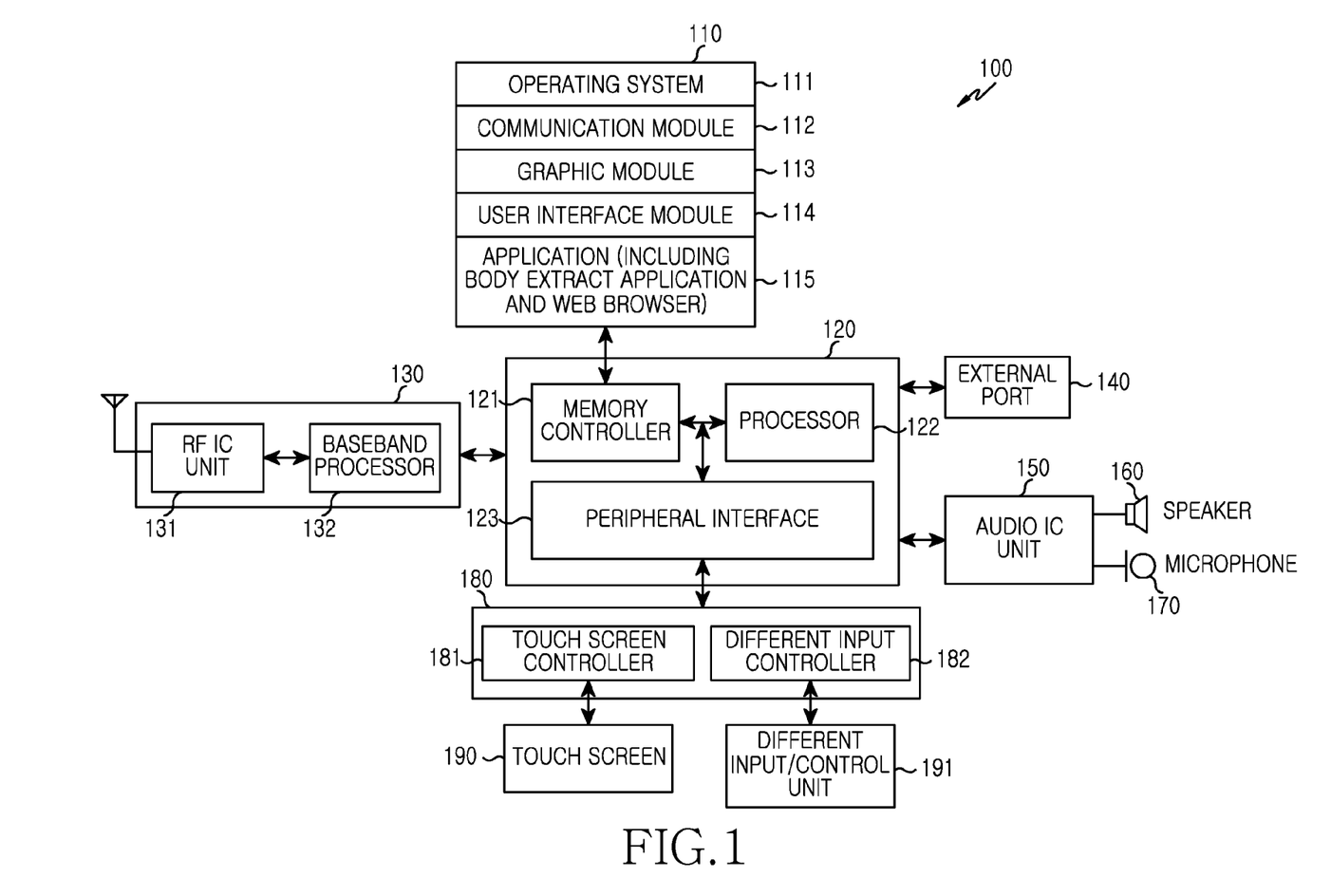
FIG. 1 illustrates an electronic device according to an exemplary embodiment of the present invention.

FIG. 1 illustrates an electronic device according to an exemplary embodiment of the present invention.

Referring to FIG. 1, a portable electronic device 100 may be a portable terminal, a mobile phone, a mobile pad, a media player, a tablet computer, a handheld computer, a Personal Digital Assistant (PDA), a laptop, or any other suitable and or similar type of portable electronic device. Also, the portable electronic device 100 may be a predetermined portable electronic device including a device that combines two or more functions among the noted types of devices that may be the portable electronic device 100.

The portable electronic device 100 may include a memory 110, a processor 120, a communication unit 130, an external port 140, an audio Integrated Circuit (IC) unit 150, a speaker 160, a microphone 170, an Input/Output (I/O) system 180, a touchscreen 190 and a different input/control unit 191. A plurality of memories 110 and external ports 140 may be used.

The processor unit 120 may include a memory controller 121, a processor (which may also be referred to as a Central Processing Unit (CPU)) 122, and a peripheral interface 123. The exemplary embodiment of FIG. 1 shows one processor unit 120, however, the invention is not limited thereto, and the portable electronic device 100 may include one or more the processors. The communication unit 130 may include a baseband processor 132, and a Radio Frequency (RF) IC unit 131. The I/O system 180 may include a touchscreen controller 181 and a different input controller 182.

Although not shown, the portable electronic device 100 may include one or more communication buses or signal lines connecting the elements shown in FIG. 1 to allow them to communication with each other. Functions of these elements may be realized using hardware, such as one or more ICs, or a combination of hardware and software. The portable electronic device 100 illustrated in FIG. 1 may include a variety of other elements that are not illustrated in FIG. 1, or may have the number of elements less than illustrated. Alternatively, the portable electronic device may be configured in any other suitable and/or similar manner.

The memory 110 may be Random Access Memory (RAM), a non-volatile memory including a flash memory, Read Only Memory (ROM), an Electrically Erasable Programmable Read Only Memory (EEPROM), a magnetic disc storage device, a Compact Disc-ROM (CD-ROM), Digital Versatile Discs (DVDs) or other optical storage devices, a magnetic cassette, any combination of the noted types of memory or any other similar and/or suitable type of storage medium. A plurality of these memories may be included.

Also, an attachable storage device that can access the portable electronic device via a communication network, such as the Internet, an Intranet, a Local Area Network (LAN), and a Wide LAN (WLAN), or a communication network configured using a combination of these communication networks may be further included. The attachable storage device may access the portable electronic device via the external port 140. Also, a separate storage device on a communication network may access the portable electronic device via the RF IC unit 131.

This memory 110 may store software. A software element may be an operating system software 111, a communication software module 112, a graphic software module 113, a user interface software module 114, and one or more application software 115. Here, the software elements and software modules may be expressed as an instruction set. Additionally, the memory 110 may store user data and any other data that may be used by or generated during the operations of the portable electronic device 100.

The operating system software 111, which may be Windows, Linux, Darwin, RTXC, UNIX, OS X, a built-in operating system such as VxWorks, or any other similar and/or suitable operating system, may include various software elements controlling a general system operation. The control of the general system operation may include memory management and control, storage hardware and/or device control and management, power control and management, or any other operations of the portable electronic device 100. The operating system software 111 may perform a function for smooth communication between various hardware and software elements.

The communication software module 112 may include various software elements for processing data transmitted and received via the RF IC unit 131 or the external port 140. The graphic software module 113 may include various software elements for providing and displaying graphics, text, a web page, an icon, a digital image and/or video, or any other visual element, on the touchscreen 190. The user interface module 114 may include various software elements related to a user interface. The user interface module 114 may include content related to how a state of a user interface changes or under what condition the change of a user interface is performed.

The application software 115 may be a variety of applications and/or functions, such as a browser, an e-mail application, an instant message application, word processing application, keyboard emulation application, an address book, a touch list, a widget, a JAVA enabled application, a coding application, a Digital Rights Management (DRM) application, voice recognition, voice duplication, a position determining function, a location based service, a music player, or any other similar and/or suitable application and/or function. Also, the application software 115 may include an application for extracting a body according to the present exemplary embodiment, and is described below. Furthermore, in a case where other elements, such as the processor 122 or the peripheral interface 123 included in the processor unit 120, access the memory 110, control for such operations may be performed by the memory controller 121.

Though the external port 140 may be a Universal Serial Bus (USB) interface, a FIREWIRE interface, or any other similar and/or suitable interface. The external port may be directly connected to a different device or may be used for indirectly connecting to a different device via a network, such as the Internet, an Intranet, a wireless LAN, or any other similar and/or suitable network type.

The peripheral interface 123 may connect the I/O peripheral units of the portable electronic device 100 to the processor 122 and the memory 110. The portable electronic device 100 may include at least one of the processor 122. The processor 122 may perform various functions for the portable electronic device 100 using various software programs, and may perform processes and controls for voice communication and data communication. Also, in addition to these general functions, the processor 122 may execute a specific software module and/or command set stored in the memory 110 in order to perform various functions corresponding to the software module and/or command set.

The processor 122, the peripheral interface 123, and the memory controller 121 may be realized in a single chip. Here, the configuration realized in the form of a single chip may be a processor unit 120. However, the present invention is not limited thereto, and each of these elements may be realized as a separate chip, or in any suitable and/or similar manner. The communication unit 130 may include the RF IC unit 131 and the baseband processor 132. The RF IC unit 131 may transmit and/or receive an electronic signal. The RF IC unit 131 may convert a baseband signal from the baseband processor 132 into another form of an electronic signal and may transmit the same via an antenna (not shown). Alternatively, the RF IC unit 131 may convert an electronic signal received via the antenna in order to provide the same to the baseband processor. The RF IC unit 131 may include a variety of elements that are not shown, such as an RF transceiver, an amplifier, a tuner, an oscillator, a digital signal processor, a Coding Decoding (CODEC) chip set, a Subscriber Identity Module (SIM) card, and any other similar and/or suitable element.

The RF IC unit 131 may communicate with a communication network and other communication devices via an electronic signal. For example, the RF IC unit 131 may communicate with the Internet, an Intranet, a network, a cellular phone network, a wireless network such as a wireless LAN and a wireless Metropolitan Area Network (MAN), other electronic devices via wireless communication, or any other similar and/or suitable network and/or element.

The RF IC unit 131 may perform communication using a variety of wireless communication schemes, methods and technologies, such as Time Division Multiple Access (TDMA), Global System for Mobile Communication (GSM), Enhanced Data GSM Environment (EDGE), Code Division Multiple Access (CDMA), Wideband Code Division Multiple Access (W-CDMA), Bluetooth, Voice over Internet Protocol (VoIP), Wireless Fidelity (Wi-Fi), Wi-MAX, an E-mail, an instant messaging, a protocol for a Short Message Service (SMS), any combination of the wireless communication schemes, methods and technologies or any other similar and/or suitable communications means.

According to an exemplary embodiment, the RF IC unit 131 may frequency-convert an RF signal received via an antenna (not shown) in order to provide the same to the baseband processor 132, and may frequency-convert a baseband signal from the baseband processor 132 in order to transmit the same via the antenna, and the baseband processor 132 may process a baseband signal. For example, in the case of performing CDMA communication, and when performing a transmission, the baseband processor 132 channel-codes and spreads data in order to transmit such data, and in a case of performing reception, the baseband processor 132 despreads and channel-decodes a reception signal.

An audio IC unit 150 may communicate with a user via a speaker 160 and a microphone 170. That is, the audio IC unit 150 may provide an audio interface between a user and the portable electronic device 100 together with the speaker 160 and the microphone 170. The audio IC unit 150 may receive a data signal from the peripheral interface 123 of the processor unit 120 and may convert the received data signal into an electric signal. The converted electric signal may be provided to the speaker 160, and the speaker 160 may convert the electric signal into a sound wave which a human being may hear and outputs the same. Also, a sound wave transferred from a human being or another sound source may be converted into an electric signal by the microphone 116. The audio IC unit 150 may receive the converted electric signal. The audio IC unit 150 may convert the received electric signal into an audio data signal and may transmit the converted audio data signal into the peripheral interface 123. The audio data may be transmitted to the memory 110 or the communication unit 130 via the peripheral interface 123. The audio IC unit 150 may include an attachable and detachable earphone, a head phone or a headset, and a jack (not shown), or any other similar and/or suitable element for providing an interface. The headset may provide both an output, such as a head phone for one ear or both ears, and an input unit, such as a microphone. The jack may also be called an earphone jack or a headset jack.

The I/O system 180 may provide an interface between an I/O unit, such as the touchscreen 190 and the different input/control unit 191, and the peripheral interface 123. The I/O system 180 may include the touchscreen controller 181 and the different input controller 182 for a different input or a control unit. A plurality of input controllers 182 may be provided. The input controller 182 may transmit and/or receive an electric signal to/from the different input/control unit 191. The different input/control unit 191 may include a button, a dial, a stick, a switch, or any other similar and or suitable element for input/control. The button may be a push button, a rocker button, or any other similar and/or suitable button.

The touchscreen 190 may provide an input/output interface between the portable electronic device 100 and a user. That is, the touchscreen 190 may transfer a user's touch input to the portable electronic device 100. Also, the touchscreen 190 may show an output from the portable electronic device 100 to a user, that is, the touchscreen 190 may show a visual output to the user. This visual output may be represented in the form of text, graphics, video, and combination thereof.

A user may perform an input via the touchscreen 190 depending on a haptic contact, a tactile contact, a combination thereof or any other similar and/or suitable type of contact and/or input. The touchscreen 190 may have a touch detect surface for receiving a user's input. For example, a contact point between the touchscreen 190 and the user may correspond to a digit of a finger used for the user's touch. Also, the user may contact the touchscreen 190 using an appropriate object such as a stylus pen. When the user performs an input via the touchscreen, the touchscreen 190 may detect a contact on the touchscreen 190 by interacting with the touchscreen controller 181 and a related software module and/or command set. The detected contact may be converted to an interaction corresponding to a user interface object, such as soft key, displayed on the touchscreen.

Various display technologies may be adopted for the touchscreen 190. For example, a Liquid Crystal Display (LCD) technology, a Light Emitting Diode (LED) technology, a Light Emitting Polymer Display (LPD) technology, or an Organic Light Emitting Diode (OLED) technology may be used. However, the present invention is not limited thereto, and any similar and/or suitable display technology may be used. The touchscreen 190 and the touchscreen controller 181 may detect a start of a contact, a movement of a contact, a stoppage or an end of a contact using various touch detect technologies such as capacitive detection, resistive detection, infrared detection, a surface wave detection, or any other similar and/or suitable technology. Also, a proximity sensor array technology or other technologies for determining a contact point on a touchscreen may be used. Also, a touch detect tablet that detects only a touch input and does not represent a visual output may be used.

The portable electronic device 100 may include a touchpad (not shown) for activating or inactivating a specific function besides the touchscreen. Unlike the touchscreen, the touchpad does not display a visual output but may detect only a touch input. The touchpad may have a separate touch surface separated from the touchscreen 190, or may be formed on an extension portion of the touch detect surface formed by the touchscreen 190.

A contact via the touchscreen 190 may be detected via operations of the touchscreen controller 181 and contact detect software. The touchscreen controller 181 may transmit and/or receive an electric signal to/from the touchscreen 190. The contact detect software may be stored as a contact detect software module (not shown) in the memory 110. The contact detect software module may include various software configurations for determining various operations related to a contact of the touchscreen 190. These software configurations may perform determinations as to whether the touchscreen is contacted, determinations for movement of a contact, determinations for a movement direction and movement time of a contact, determinations as to whether a contact is stopped, and any other similar and/or suitable determinations. The determination for the movement of a contact may include determining a movement velocity, size, direction, acceleration, or a combination of such elements of a movement of a contact.

Also, the portable electronic device 100 may perform an input corresponding to a user's motion performed on the upper portion of the touchscreen. This input may be detected via operations of the touchscreen controller 181 and a motion detect software. The touchscreen controller 181 may transmit and/or receive an electric signal to/from the touchscreen 190. The motion detect software may be stored as a motion detect software module (not shown) in the memory 110. The motion detect software module may include various software configurations for determining a motion related to motion detection of the upper portion of the touchscreen 190. These software configurations may perform determination for a motion start of the touchscreen upper portion, determination for movement of a motion, determination for a movement direction and a movement time of a motion, determination as to whether a motion is stopped, or any other similar and/or suitable determination. The determination for the movement of a motion may include determination of a movement velocity, size, direction, acceleration, or any other similar and or suitable determination of a motion.

Also, the portable electronic device 100 may include a power system (not shown) for supplying power to various elements included in the portable electronic device 100. The power system may include a power source, such as an alternating current power source or a battery, a power error detect circuit, a power converter, an inverter, a charge unit, a power state display unit, such as a light emitting diode, or any other similar and or suitable elements of a power system. Also, the power system may include a power management and control unit for generating, managing, and distributing power.

The portable electronic device 100 may input various functions that may be performed by the touchscreen 190 using a separate touchpad. These various functions may be performed by a physical input/control unit, such as a dial or a button. A push button for turning on/off and for locking the portable electronic device 100, a volume control rocker button, a ringer profile, a slider switch for toggling, may correspond to this physical input/control unit. Also, the portable electronic device 100 may include a function for processing a voice input for activating and inactivating a predetermined function via the microphone 170.

Figure 2:
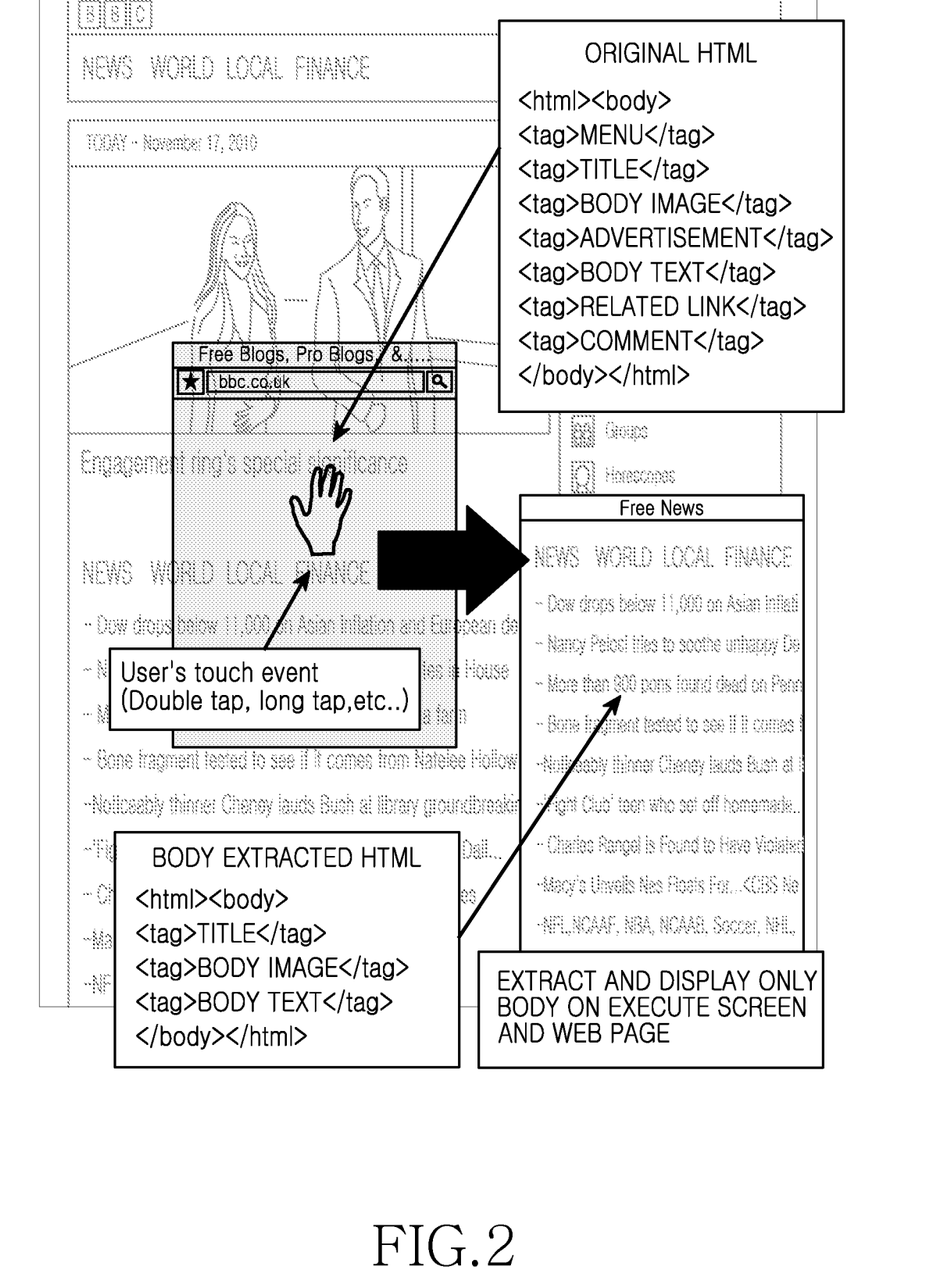
FIG. 2 is a schematic view illustrating a body extract process according to an exemplary embodiment of the present invention.

FIG. 2 is a schematic view illustrating a body extract process according to an exemplary embodiment of the present invention.

Referring to FIG. 2, when a user touches a specific portion of a relevant web page during a web surfing, an application for extracting a body analyzes original HyperText Markup Language (HTML) in order to configure and display the HTML where a body has been extracted. That is, the application for extracting the body extracts and displays only the body. When configuring the HTML where a body has been extracted, the application for extracting the body extracts and displays the body according to a coordinate corresponding to a user touch point.

Figure 3:
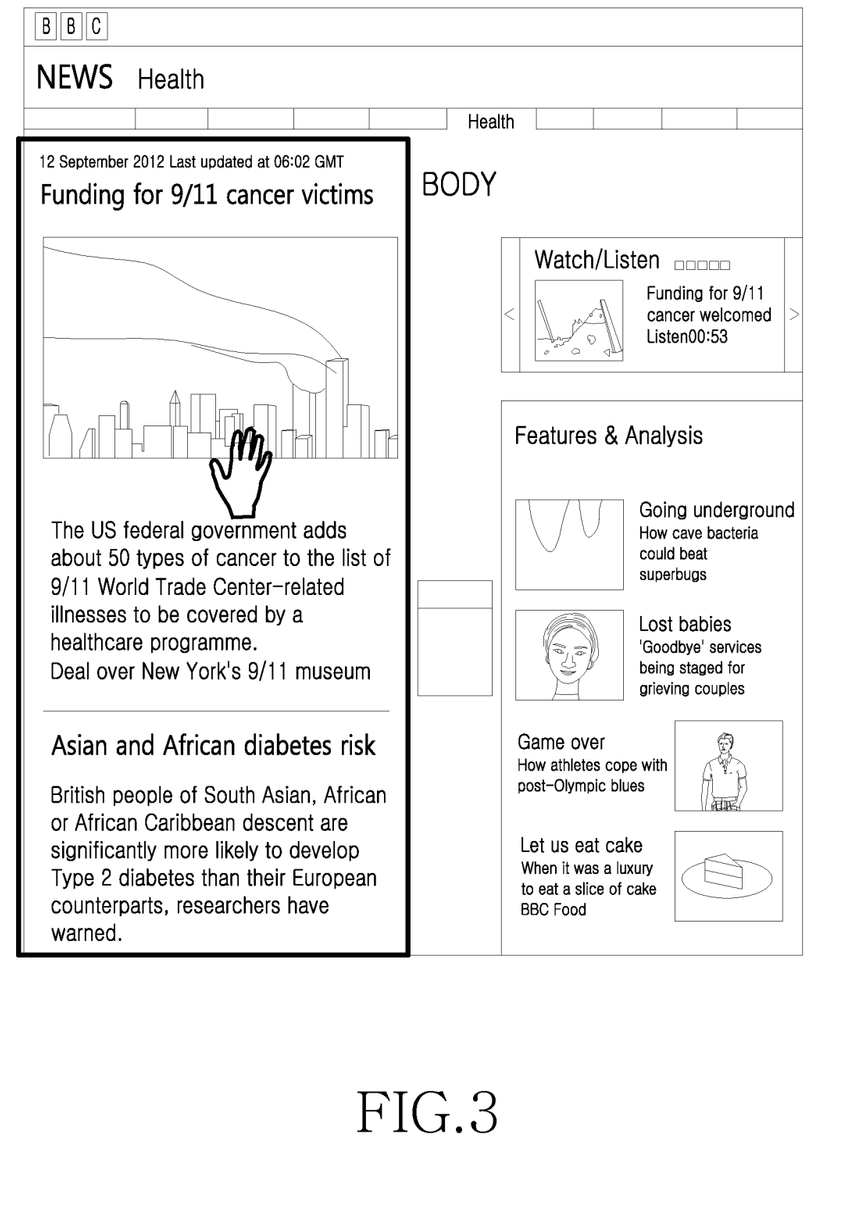
FIG. 3 is a view illustrating a body region according to an exemplary embodiment of the present invention.

FIG. 3 is a view illustrating a body region according to an exemplary embodiment of the present invention.

Figure 4:
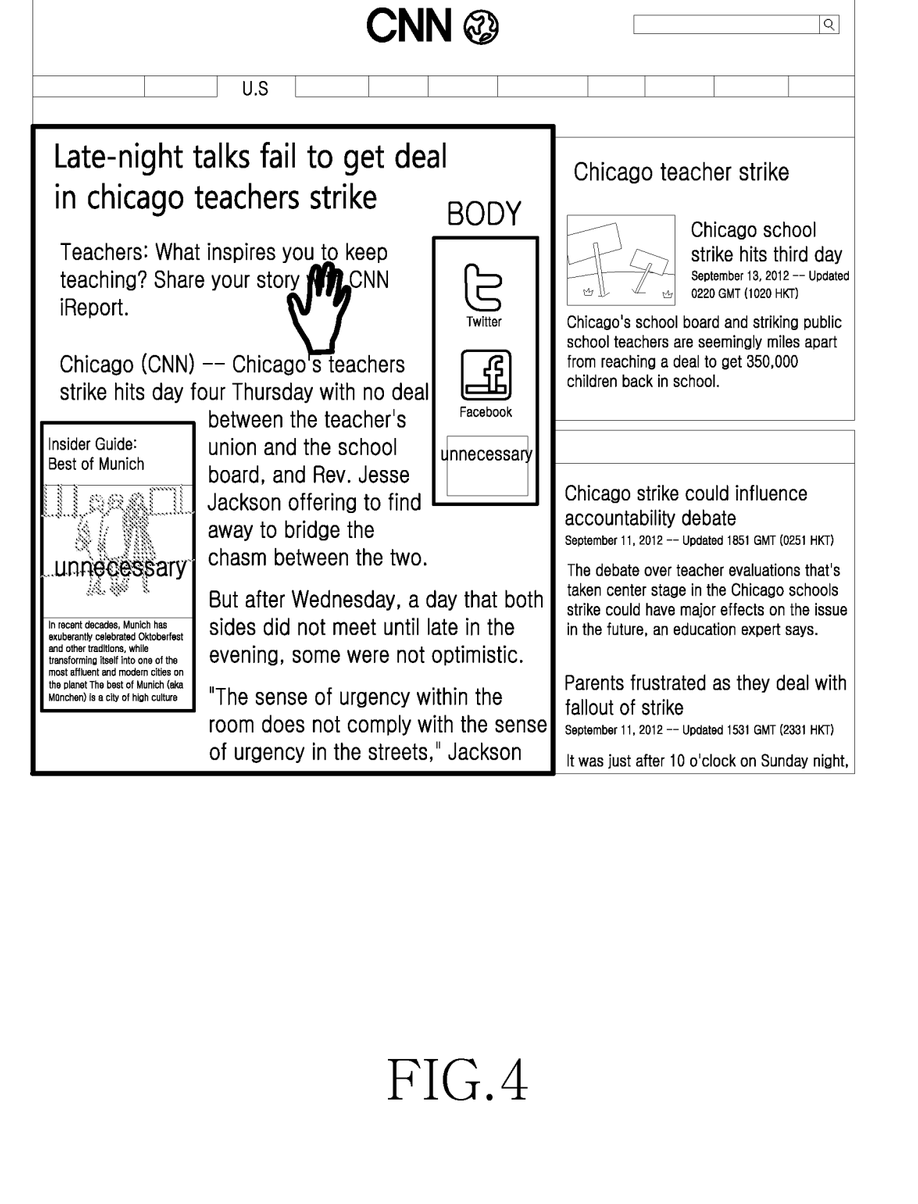
FIG. 4 is a view illustrating a body region according to an exemplary embodiment of the present invention.

FIG. 4 is a view illustrating a body region according to an exemplary embodiment of the present invention.

Figure 5:
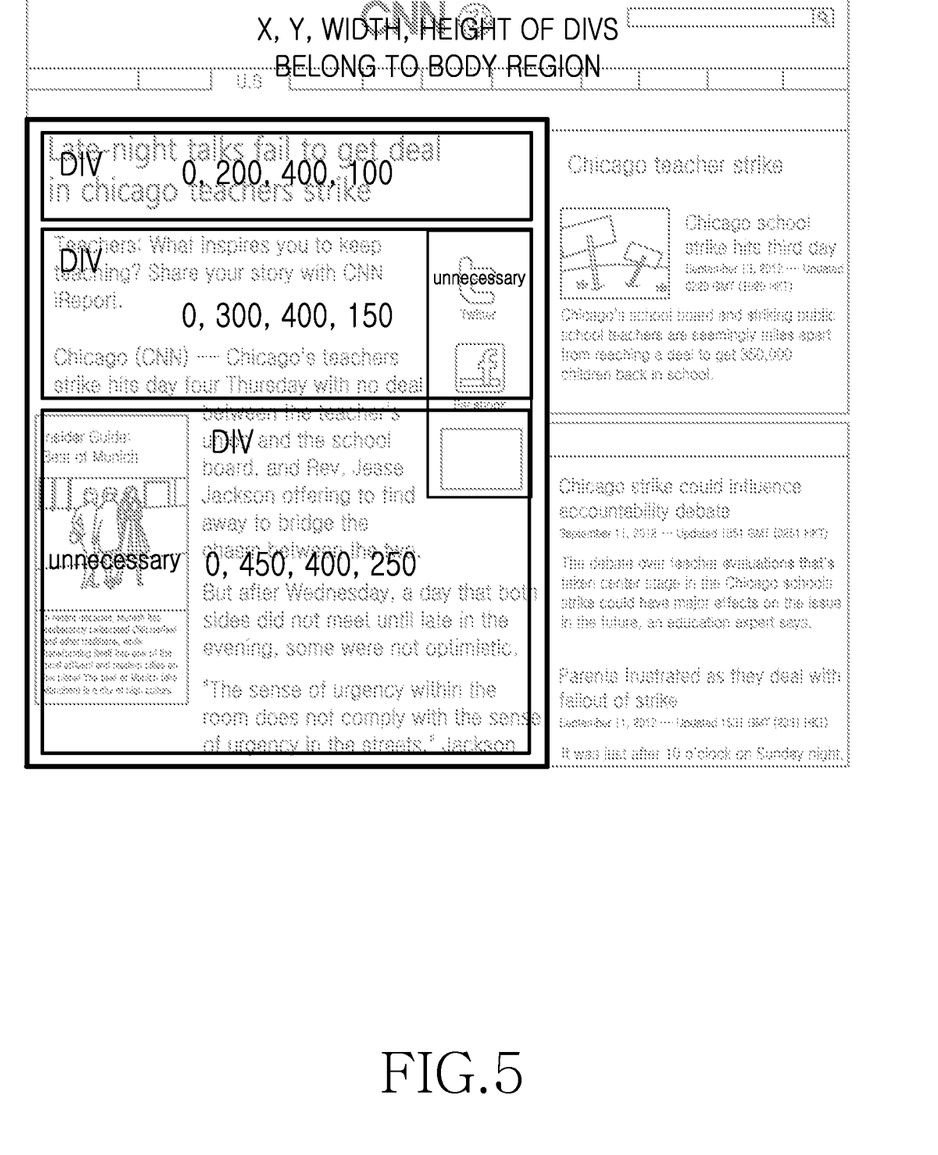
FIG. 5 is a view illustrating a coordinate and a width of a region according to an exemplary embodiment of the present invention.

FIG. 5 is a view illustrating a coordinate and a width of a region according to an exemplary embodiment of the present invention.

Figure 6:
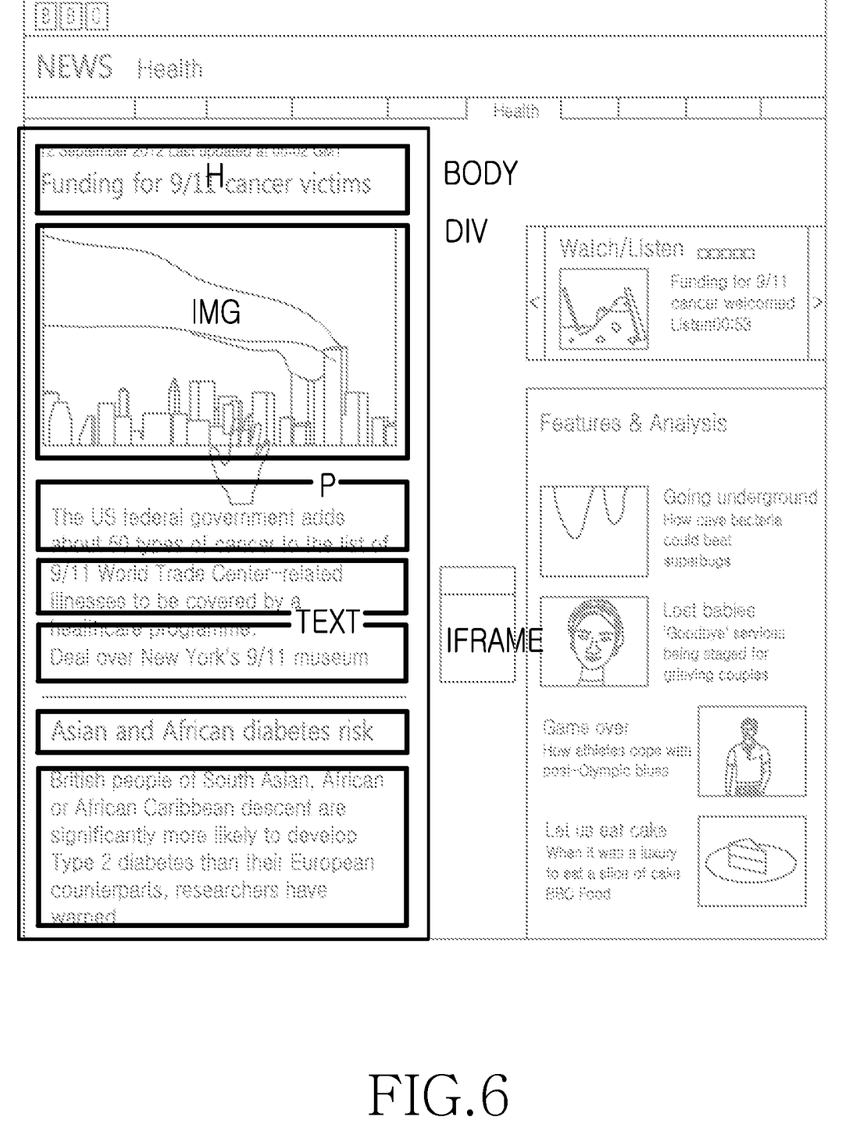
FIG. 6 is a view illustrating a start node according to an exemplary embodiment of the present invention.

FIG. 6 is a view illustrating a start node according to an exemplary embodiment of the present invention.

Figure 7:
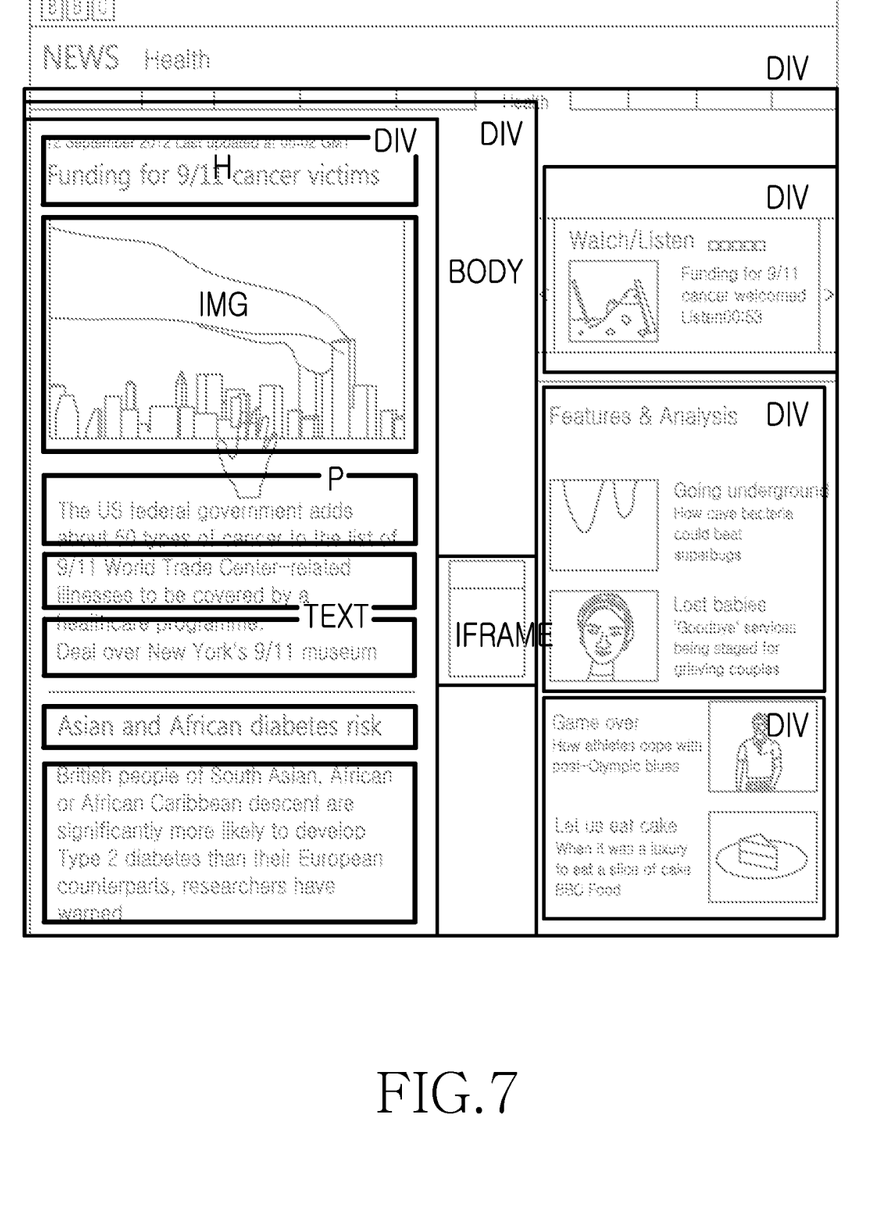
FIG. 7 is a view illustrating various kinds of tags according to an exemplary embodiment of the present invention.

FIG. 7 is a view illustrating various kinds of tags according to an exemplary embodiment of the present invention.

Referring to FIGS. 3-7, terminologies used for describing the exemplary embodiments of the present invention are defined below. A body region may represent a region to which contents, such as text and images, which correlate to the user's interests, focus and/or attention, in a web page, as illustrated in FIG. 3. An unnecessary region may exist in the body region, as illustrated in FIG. 4. The application for extracting a body according to the present exemplary embodiment may selectively display only the body region excluding the unnecessary region in the body region.

A user's input coordinate may be a coordinate of a position touched by the user. According to the present exemplary embodiments, the user may perform an input on the portable electronic device 100 by touching, mouse-clicking, or performing any suitable input action corresponding to a region from which body extraction is required. A start node may be a node corresponding to a user's input coordinate on a web page. All contents displayable on a screen may be a start node. A start node that may be designated by a user in a web page may be text, an image, a space defined by a layout tag, or any other similar and/or suitable element that may be designated. A region tag may represent all tags related to arrangement and/or layout in a web page. Examples of the region tag include body, table, div, span, ul, dl, iframe, frameset, or any other similar and/or suitable region tag.

A start region may represent a closest region tag to which a start node belongs. A coordinate and a width of a region may represent a coordinate and a size of a region tag, including all unhidden region tags, as illustrated in FIG. 5. A coordinate may represent a left upper reference coordinate, such as a position (x,y), in a web page, and a size may represent a width and a height. A body configuration region may represent a region which is not a start region in a body region. An analysis object region may represent a region where a width and x coordinate are similar to those of a start region from among an examined region of the start region, which will be described below in detail.

In the portable electronic device 100 according to the present exemplary embodiments, a body extraction process is described as follows. First, a user may input a coordinate of a location for which body extraction is to be performed, and the portable electronic device 100 starts the body extraction according to the coordinate. In this case, the user may designate a specific coordinate of a web page from which a body is to be extracted via the touchscreen 190 and the different input/control unit 191, which may be a mouse. When a coordinate is input from the user, a web browser sets a node, which may be contents such as text, an image, an HTML tag itself, and any other suitable element, corresponding to the input coordinate to a "start node", and may then start the body extraction. In this process, an HTML file of a web page may be analyzed in the web browser, nodes of the HTML file may be converted to a Document Oriented Model (DOM), and a web browser engine may determine an arrangement and/or layout of contents based on the DOM.

A start node may represent a front-end node located at a coordinate, such as a location (x, y), touched by a user. In addition, an object of the start node may be all tags corresponding to the coordinate input by the user. All of tags directly displayed to a user, such as IMG, TEXT, or any other similar tag that is enclosed by a blue box or tags, such as DIV, and IFRAME, corresponding to an empty blank, such as a space generated by a layout tag such as DIV or IFRAME, TABLE, UL, BODY, in FIG. 6 may become a start node. After the start node is set, a body region may be set, or in other words, a range of the body may be set.

When setting the body region, an application for extracting a body according to the present exemplary embodiments analyzes whether each region tag is needed for a user on a region tag basis. The region tag denotes all tags related to a layout, such as an arrangement of respective contents in a page, in a web page. Examples of the region tag include Body, Div, Span, Table, Ul, Dl, or any other similar tag. That is, the application for extracting a body analyzes whether each region tag is needed for a user in a web page, as illustrated in FIG. 7. After that, when setting a body region, the application for extracting a body sets a start region.

The application for extracting the body recognizes a closest region tag, to which a start node belongs, as the start region. The closest region tag may be found using a method for searching for a closest region tag from among ancestors of a start node in a DOM. When the application for extracting the body has found the start region, the application stores an x coordinate, for example a DivS.posX coordinate, and a width, which may be a DivS.width value, of the start region in order to determine body configure regions that will configure a body region together with the start region. Accordingly, the application sets the start region because one body may be divided into a plurality of region tags. For example, though a body is formed of one region tag in FIG. 7, one body of an actual web page may be separated using numerous region tags.

More particularly, since numerous region tags exist in a web page that includes an image, comments, and other similar elements, one body may be formed by collecting other region tags using the start region as a reference. After that, when setting a body region, the application for extracting a body sets a body configure region for setting a body region. Since a body of a web page may be arranged to have a similar x coordinate and a similar width and so that an entire content may be displayed using a vertical scroll that scrolls from an upper portion to a lower portion of the web page, the application for extracting a body sets the body configure region using the x coordinate and the width as a reference.

Before setting the body configure region, a range for searching for the body configure region should be set and a region included in the range for searching the body configure region may be referred to as an analysis object region. A condition for determining the analysis object region is that the analysis object region meets the following coordinate and size conditions, and a closest ancestor node in the start region may be used to determine the condition. A coordinate condition denotes that the analysis object region is positioned at a coordinate that does not deviate much from the start region. Specific coordinate conditions are given below:

Coordinate condition 1: DivB (analysis object region).posX>DivS (start region).posX*predetermined constant 1; and Coordinate condition 2: DivB (analysis object region).posX<DivS (start region).posX*predetermined constant 2.

The predetermined constants 1 and 2 may be determined by an experiment or a theoretical value, or by any other similar and/or suitable manner.

The size conditions denote that the analysis object region has a size similar to the size of the start region, and are given below:

Size condition 1: DivB (analysis object region).width>DivS (start region).width*predetermined constant 3; and Size condition 2: DivB (analysis object region).width<DivS (start region).posX*predetermined constant 4.

The predetermined constants 3 and 4 may be determined by an experiment or a theoretical value, or by any other similar and/or suitable manner.

When an Article tag or a Body tag is found while ancestor regions are being searched, these tags are set as an analysis object region. The Article tag may be a tag indicating a body in HTML5, and the Body tag may be an uppermost tag from among tags displayed on a screen. After the analysis object region has been determined, the application for extracting a body retrieves body configure regions. The body configure region may represents all region tag inside the analysis object region that is set using the above discussed manner. When an unnecessary region is not removed, a relevant region may be determined as a body region.

Figure 8:
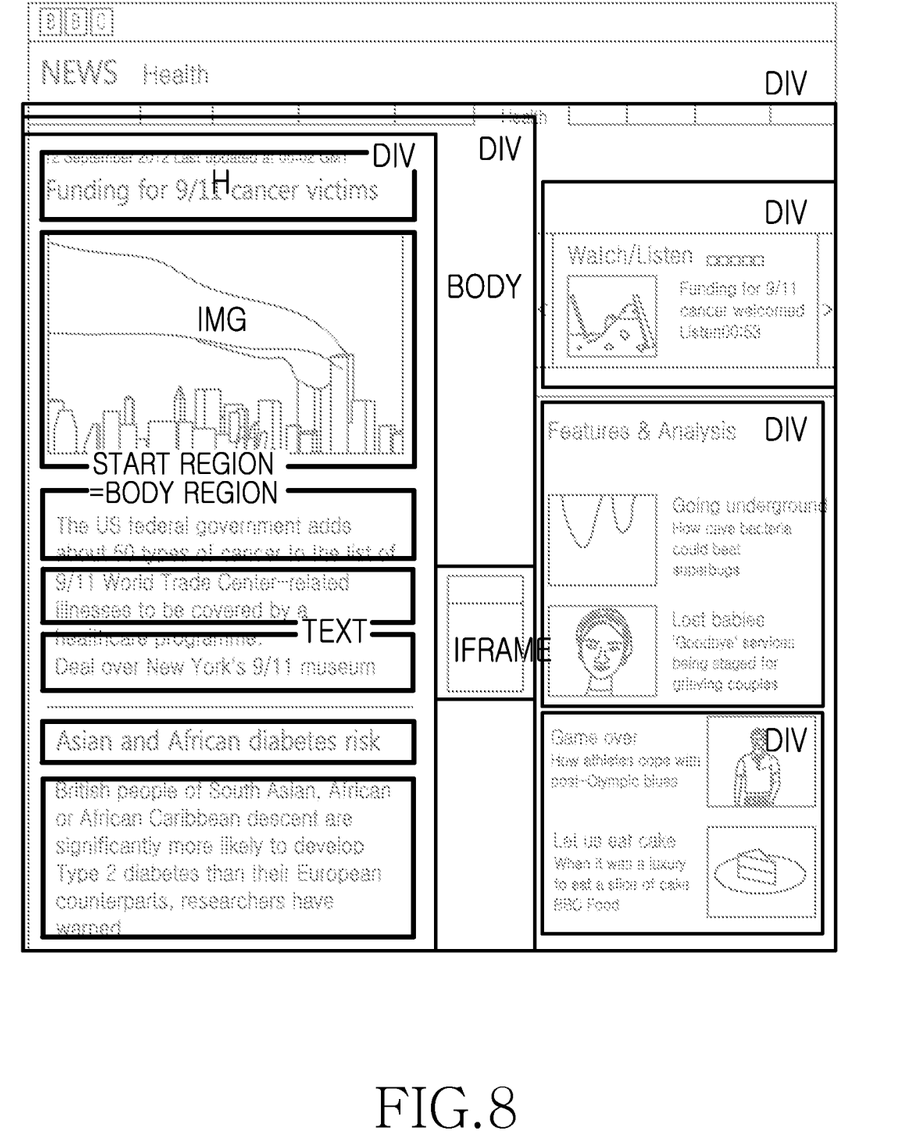
FIG. 8 is a view illustrating a case where a start region and a body region are the same according to an exemplary embodiment of the present invention.

FIG. 8 is a view illustrating a case where a start region and a body region are the same according to an exemplary embodiment of the present invention.

Referring to FIG. 8, since a region tag having an x coordinate and a width similar to those of a start region does not exist, then the start region corresponds to a body region.

Figure 9:
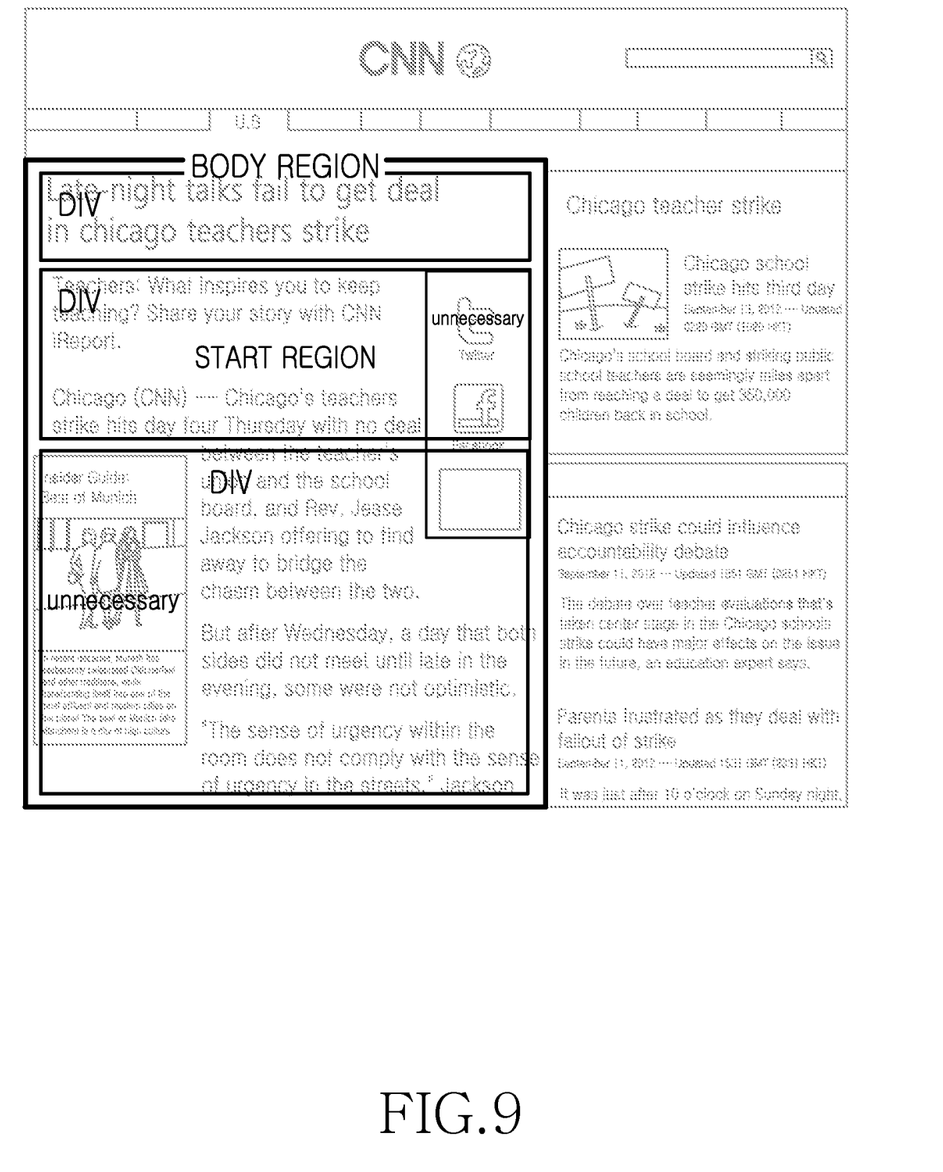
FIG. 9 is a view illustrating a case where a plurality of region tags form one body region according to an exemplary embodiment of the present invention.

FIG. 9 is a view illustrating a case where a plurality of region tags form one body region according to an exemplary embodiment of the present invention.

Referring to FIG. 9, since a plurality of region tags have a similar x coordinate and a similar width in FIG. 9, the plurality of region tags form one body region. Furthermore, FIG. 9 illustrates that an unnecessary region exists among the plurality of region tags and when this region is removed.

Figure 10:
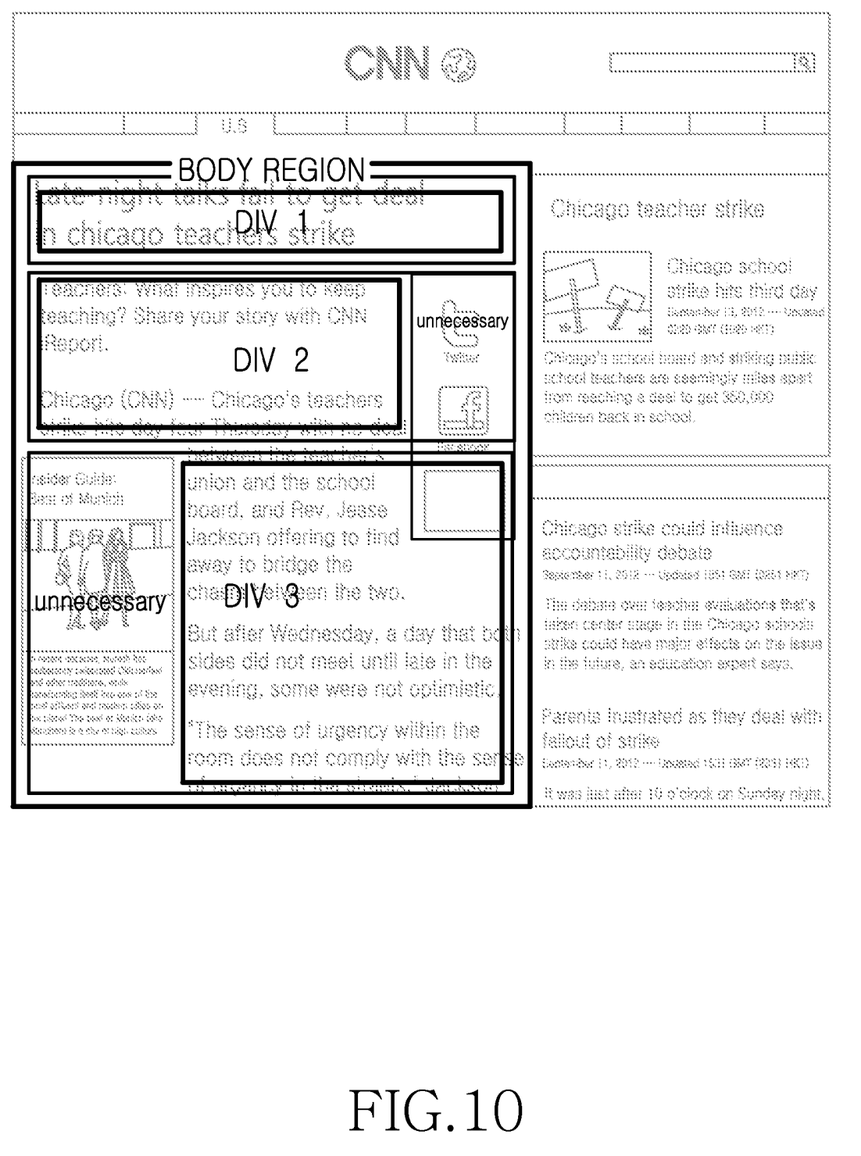
FIG. 10 is a view illustrating a case where unnecessary regions have been removed according to an exemplary embodiment of the present invention.

FIG. 10 is a view illustrating a case where unnecessary regions have been removed according to an exemplary embodiment of the present invention.

Referring to FIG. 10, region tags are shown in FIG. 10. In the above-described body region setting, when the body region is configured, region tags having an x coordinate and a width similar to those of the start region, such as a region (Div) 2 of FIG. 10, are included in a body region, and it may be determined that an x coordinate or a width of a different region tag inside a start region, such as region 2, and a body region of FIG. 10 are not similar. However, this is only a difference in a factor of an inline/block, and actually, regions 1, 2, and 3 in a DOM are boxes displayed as illustrated in FIG. 9.

In HTML, text is an inline tag. When a block factor having a floating attribute exists inside a region, contents are arranged suitable for a portion excluding a region of a relevant block factor. A region 3 of FIG. 10 is taken as an example as below.

TABLE 1

<div id="region3" width=400>
   <div id="related link " width=100> ... related links... </div>
   <p>.... article body......</p>// when the width of region 3 is 400, exclude the width 100 of the related link,
   <p>.... article body......</p>// the article bodies are arranged at the right side.
</div>

Referring to Table 1, when a width of the region 3 is 400, article bodies may be arranged at the right side, while excluding the width 100 of a related link, so that an x coordinate and a width of the region 3 actually held by a DOM are similar to those of a start region unlike that displayed on the screen. After that, the application for extracting a body according to the present invention removes unnecessary regions.

Links or advertisements may be included in a body region, as illustrated in FIG. 10. However, these links and advertisements are unnecessary when showing only a body to a user, and thus, these regions may be removed. A direction of determining and processing unnecessary links and advertisements, which may be referred to as contents, is described below.

First, since a tag that is displayed on the screen may be unnecessary, for example, an iframe that is used for loading an advertisement template of an external sponsor, the unnecessary tag may be deleted. In the case where the number of linked contents, i.e., the contents linked by one tag, may be excessively large compared to unlinked general contents inside one region, then the application for extracting a body processes is as follows.

Linked contents are frequently used inside a body, but the number of linked contents used inside the body may be very small as compared to unlinked contents. However, in a case where most of advertisements are linked to a website for selling or advertising object goods when a user interested in an advertisement clicks the advertisement, the a predetermined value may be set to a threshold based on this, and when a ratio of linked contents exceeds the threshold inside one region, then a relevant region may be regarded as an unnecessary region. Accordingly, this region may be removed from contents that are to be displayed to a user.

In other words, when a specific condition is met, it may be determined that a region is not an advertisement and that region may be regarded as part of the body. For example, an advertisement remove condition may be set as [DivBn.linkTextLength*predetermined constant 5<DivBn.normalTextLength], and when the condition is not met, it may be determined that contents are advertisement contents.

Also, the application for extracting a body may recognize that each region is a body only when each region has a minimum number of letters or an image having at least a predetermined size, such as an image having a size that is at least half of the width of a "start region". For example, in the case where a minimum condition for recognizing a body is [DivBn.normalTextLength>predetermined constant 6] or [DivBn.ImageWidth>DivS.width/2], a region may be recognized as a body.

Furthermore, an invisible tag may also be processed in the manner described below. Though not displayed on a web page, numerous tags may exist inside a body region, and such tags may be referred to as invisible tags. However, among these tags, there are many tags defining attributes, such as color or font, of contents or may be related to a script and, thus, may be unnecessary for configuring content of a body. That is, unnecessary tags may be considered to be a tag that is not displayed on the screen and a tag that is for configuring a user interface control. Accordingly, invisible tags, such as script, link, style, html, noscript, etc., and user interface control configure tags, such as form, select, label, input, etc. may be deleted. After deleting such tags, the application for extracting a body determines whether to display body extraction results.

A reference may be used for determining whether contents are a body that should be displayed to a user or are useless values. In a case where such a reference is used as a result of performing the above process, such that contents of a specific number, such as a predetermined constant 7, or less have been extracted, it may be determined that body extraction has failed and results are not displayed. In other words, a body, after the above-described body extraction process is performed, may be referred to as Article, and when a text length of this Article is a predetermined constant or more, the extracted body may be displayed. The above predetermined constants 1-7 may be determined according to an experiment, a theoretical value, or any other similar and/or suitable manner.

Figure 11:
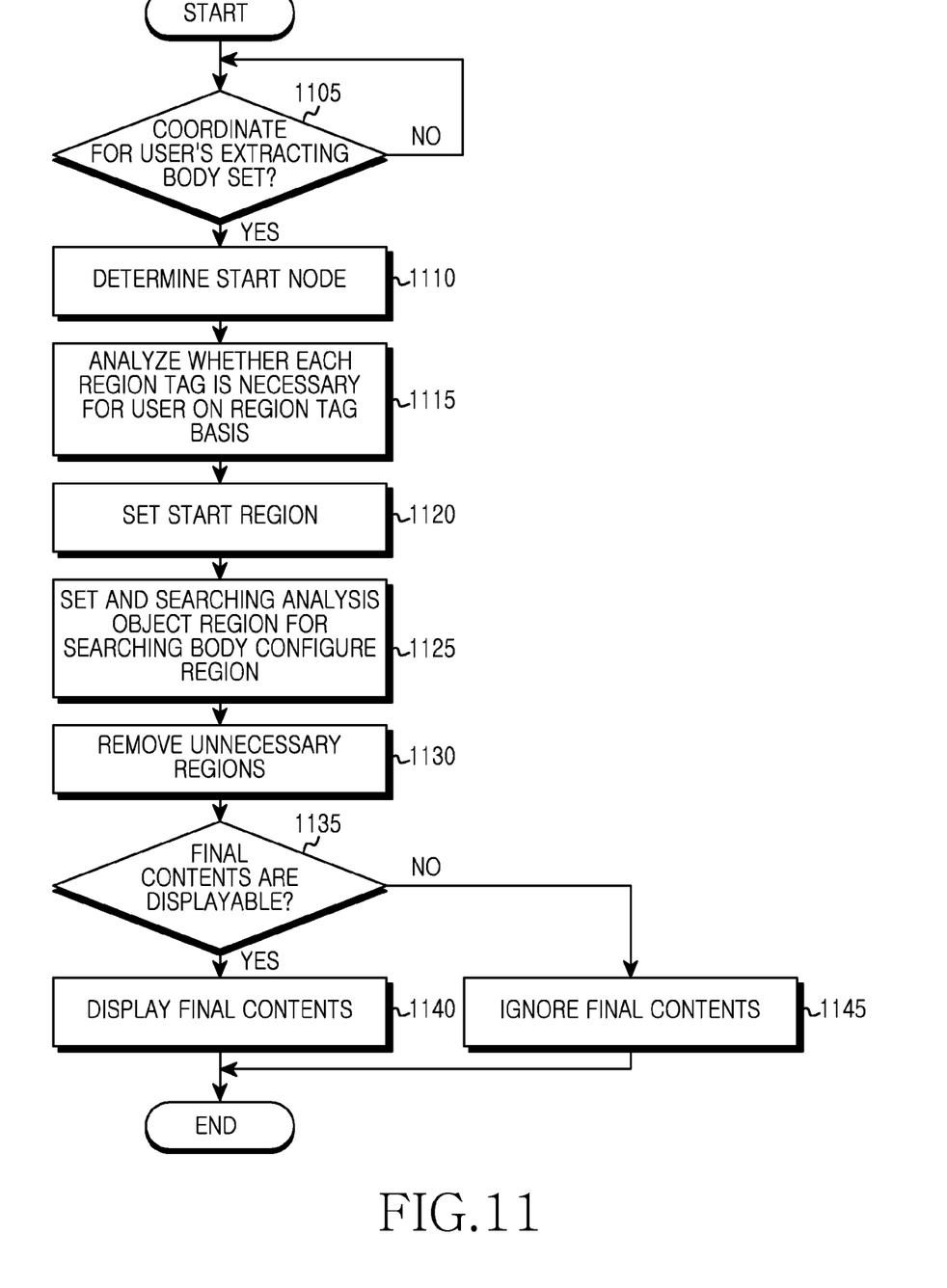
FIG. 11 is a flowchart illustrating a body extract process according to an exemplary embodiment of the present invention.

FIG. 11 is a flowchart illustrating a body extract process according to an exemplary embodiment of the present invention.

Referring to FIG. 11, in the case where a coordinate for user's extracting a body is set at step 1105, that is, when the user determines a position for extracting a body on a display screen, an application for extracting a body determines a start node at step 1110. Next, the application for extracting a body analyzes whether each region tag is necessary for a user on a region tag basis at step 1115.

After that, the application for extracting a body sets a start region at step 1120, and then sets and searches an analysis object region for searching a body configure region at step 1125. Next, the application for extracting a body removes unnecessary regions at step 1130, and then determines whether the extracted final contents are displayable, that is, whether a condition for displaying the extracted final contents is met at step 1135.

When the condition for displaying the extracted final contents is met at step 1135, then the application for extracting a body displays the final contents, that is, the finally determined body, at step 1140. When the condition for displaying the extracted final contents is not met at step 1135, then the application for extracting a body ignores the final contents and ends the a body extract process at step 1145.

The exemplary embodiments, as described above, extract and display only a body of a region which a user needs, thereby reducing power consumption of a portable electronic device and reducing an amount of processing executed by a CPU, and providing high readability to a user by removing unwanted contents from a web page or site.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for extracting a body from a web page, the method comprising:
    displaying the web page;
    detecting a touch input on a specific portion of the displayed web page;
    determining a start node for the extracting of the body based on the specific portion of the web page corresponding to the touch input;
    determining a start region based on a closest region tag to the touch input in the start node;
    determining an analysis object region for setting a body region based on a position and a size of the start region, wherein the analysis object region includes a closest region to which the start region belongs;
    removing unnecessary regions without affecting layout of the web page in the analysis object region;
    determining the body region based on a relevant region that is not removed in the analysis object region; and
    displaying the determined body region without displaying the unnecessary regions on the web page.

2. The method of claim 1, wherein the displaying of the determined body region comprises:
    determining a condition for displaying the determined body region; and
    displaying the determined body region when the condition for the displaying of the determined body region is met.

3. The method of claim 2, wherein the condition for the displaying of the determined body region is that the determined body region includes at least a predetermined quantity of text.

4. The method of claim 1, wherein the determining of the body region comprises:
    determining whether a region tag corresponds to an unnecessary region for a user to view the body from the web page;
    determining the analysis object region in order to set a body configure region; and
    removing the unnecessary regions from the body region according to the body configure region.

5. The method of claim 4, wherein the analysis object region comprises a region of a closest ancestor node in the start region that meets coordinate and size conditions.

6. The method of claim 5, wherein the coordinate condition is that the analysis object region is within a predetermined range in the start region.

7. The method of claim 5, wherein the size condition is that the analysis object region has a size within a predetermined range from a size of the start region.

8. The method of claim 4,
    wherein the removed nodes are either sibling nodes or child nodes with respect to the start node, and
    wherein the content nodes are either sibling nodes or child nodes with respect to the start node.

9. The method of claim 4, wherein the start region comprises the closest region to which the start node belongs.

10. The method of claim 4, wherein the body configure region comprises a region which is not the start region in the body region.

11. An electronic device for extracting a body from a web page, the electronic device comprising:
    a touchscreen configured to detect a touch input and to display the web page;
    a memory; and
    at least one processor configured to:
        detect the touch input on a specific portion of the displayed web page,
        determine a start node for the extracting of the body based on the specific portion of the web page corresponding to the touch input,
        determine a start region based on a closest region tag to the touch input in the start node,
        determine an analysis object region for setting a body region based on a position and a size of the start region, wherein the analysis object region includes a closest region to which the start region belongs,
        remove unnecessary regions without affecting layout of the web page in the analysis object region,
        determine the body region based on a relevant region that is not removed in the analysis object region, and
        display the determined body region without displaying the unnecessary regions on the web page.

12. The electronic device of claim 11, wherein, when displaying the determined body region, the at least one processor is further configured to:
    determine a condition for displaying the determined body region; and
    display the determined body region when the condition for the displaying of the determined body region is met.

13. The electronic device of claim 12, wherein the condition for the displaying of the determined body region is that the determined body region includes at least a predetermined quantity of text.

14. The device of claim 11, wherein the at least one processor is further configured to:
    when determining the body region, determine whether a region tag corresponds to an unnecessary region for a user to view the body from the web page, determine the analysis object region in order to set a body configure region, and remove the unnecessary regions from the body region according to the body configure region.

15. The electronic device of claim 14, wherein the analysis object region comprises a region of a closest ancestor node in the start region that meets coordinate and size conditions.

16. The electronic device of claim 15, wherein the coordinate condition is that the analysis object region is within a predetermined range in the start region.

17. The electronic device of claim 15, wherein the size condition is that the analysis object region has a size within a predetermined range from a size of the start region.

18. The electronic device of claim 14,
wherein the removed nodes are either sibling nodes or child nodes with respect to the start node, and
wherein the content nodes are either sibling nodes or child nodes with respect to the start node.

19. The electronic device of claim 14, wherein the start region comprises the closest region to which the start node belongs.

20. The electronic device of claim 14, wherein the body configure region comprises a region which is not the start region in the body region.

* * * * *